United States Patent [19]

Tonomura

[11] 4,301,757
[45] Nov. 24, 1981

[54] AUTOMATIC THREAD TENSION CONTROL DEVICE OF SEWING MACHINE

[75] Inventor: Yoshiaki Tonomura, Hachioji, Japan

[73] Assignee: Janome Sewing Machine Co. Ltd., Tokyo, Japan

[21] Appl. No.: 45,777

[22] Filed: Jun. 5, 1979

[30] Foreign Application Priority Data

Jun. 13, 1978 [JP] Japan ................. 53-70340

[51] Int. Cl.³ ............ D05B 47/00; D05B 15/00
[52] U.S. Cl. ......................... 112/254; 112/59
[58] Field of Search ............ 112/254, 59, 97; 250/560

[56] References Cited

U.S. PATENT DOCUMENTS 3,190,249 6/1965 Gegauf ................... 112/254
3,856,233 12/1974 Thomas ................ 112/254 X
4,166,423 9/1979 Brienza et al. ............ 112/254

FOREIGN PATENT DOCUMENTS 2809848 9/1978 Fed. Rep. of Germany ...... 112/254
701229 12/1953 United Kingdom ............ 112/254
247774 10/1970 U.S.S.R. ...................... 112/254

Primary Examiner—Ronald Feldbaum
Attorney, Agent, or Firm—Michael J. Striker

[57] ABSTRACT

An electronic thread tension control device whereby electrical signals indicating the fabric thickness, the amount of fabric being fed, the needle's amplitude and the size of the thread to be used are transmitted to the control circuitry thereby producing the appropriate output signal that will adjust the tensioning means accordingly.

6 Claims, 7 Drawing Figures

ⓐ Fabric thickness
ⓑ Fabric feeding amount
   needle swinging amount
ⓒ Thickness, Sort
ⓓ ALU
ⓔ D/A Converter
ⓕ Upper thread drawn-out amount
ⓖ Comparator
ⓗ Thread tension adjusting device

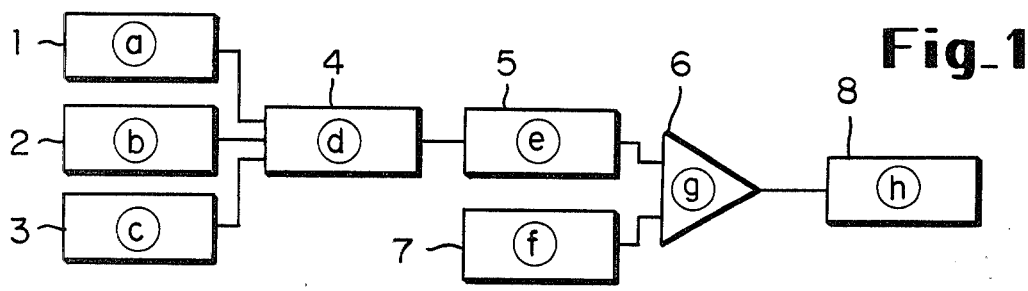
Fig_1
ⓐ Fabric thickness
ⓑ Fabric feeding amount needle swinging amount
ⓒ Thickness, Sort
ⓓ ALU
ⓔ D/A Converter
ⓕ Upper thread drawn-out amount
ⓖ Comparator
ⓗ Thread tension adjusting device
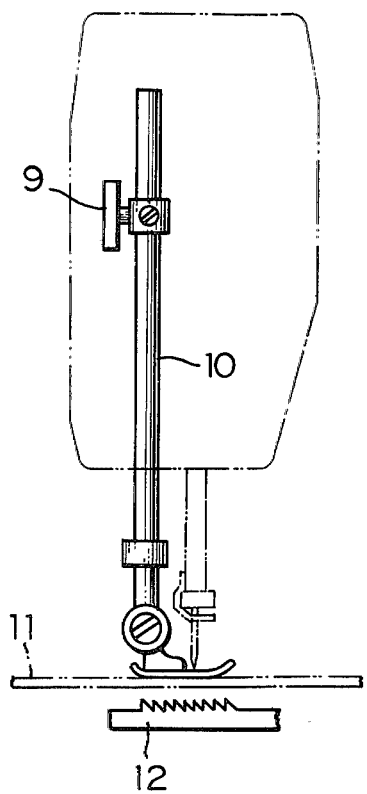
Fig_2
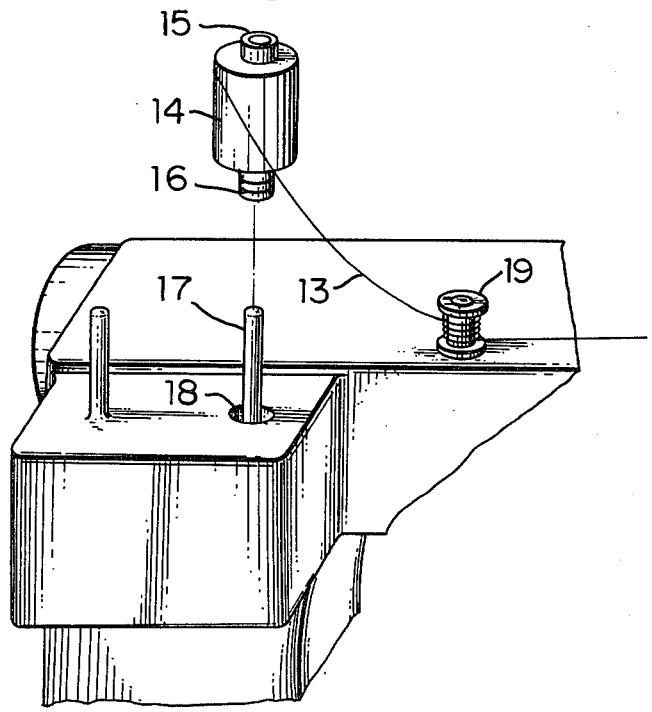
Fig_3

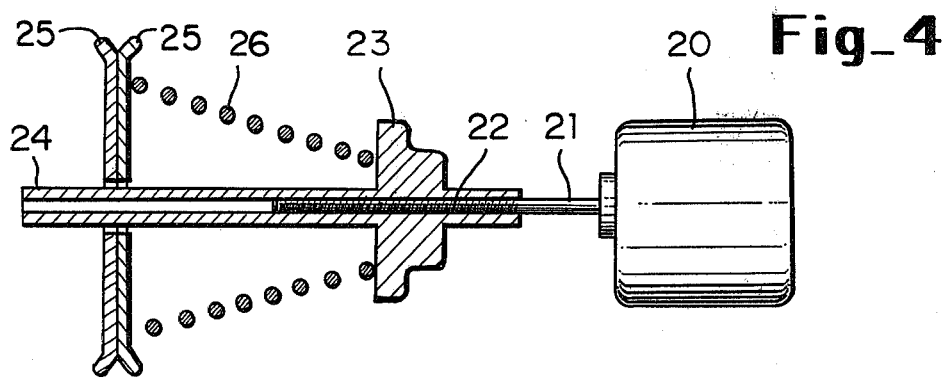
Fig_4
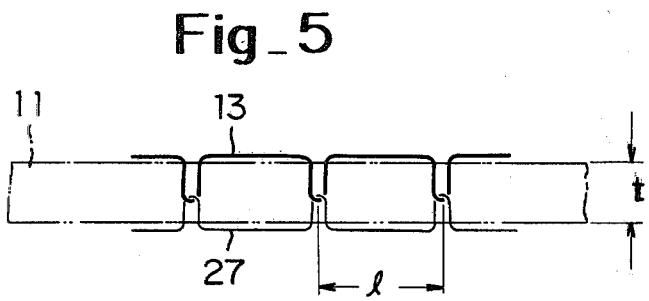
Fig_5
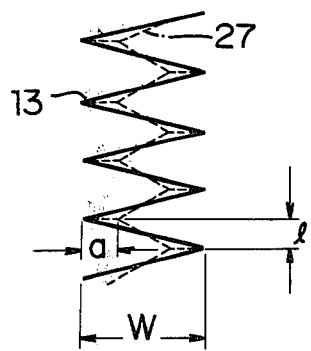
Fig_6
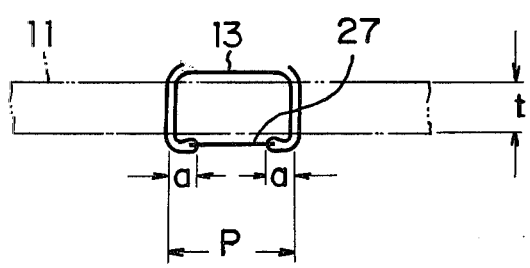
Fig_7

AUTOMATIC THREAD TENSION CONTROL DEVICE OF SEWING MACHINE

BACKGROUND OF THE INVENTION

This invention relates to a thread tension control device of sewing machine which is automatically operated to control the thread tension in accordance with the stitching types of the sewing machine.

The most suited stitches or seams can be obtained only by suitably controlling the upper thread tension in accordance with the conditions in dependence upon the stitching types. However there have not been offered any proposals which are to automatically control the upper thread tension in response to various stitching conditions, and therefore desired or suitable formation of stitches have been obtained only by manual adjustment of the thread tension device in accordance to the stitching conditions.

This invention has been devised to eliminate such a disadvantage of the prior art.

SUMMARY OF THE INVENTION

It is a primary object of the invention to automatically control the thread tension in response to the stitching condition.

It is a second object of the invention to provide such a thread tension control device of a simple structure. a thread tension control device of a simple structure.

According to the invention, the actually drawn out amount of upper thread is measured, and a desired drawn out amount of upper thread is identified on the stitching conditions such as the thickness of a fabric to be sewn, the thickness and sort of an upper thread to be used, the fabric feeding amount and the lateral swinging movement of the needle. The actual value and the identified value are compared, and the positive or negative difference is applied to suitably control the thread tension adjusting device of the sewing machine.

The other features and advantages of the invention will be apparent from the following description of the invention in reference to the preferred embodiment as shown in the attached drawings.

BRIEF DESCRIPTION OF THE DRAWINGS

FIG. 1 is a control circuit block diagram to be used in this invention,

FIG. 2 is a side view of a mechanism for measuring the thickness of a fabric to be sewn, FIG. 3 shows a mechanism for obtaining a signal indicating the thickness and sort of the upper thread, and a mechanism for measuring the actual drawn out amount of the upper thread, FIG. 4 is a thread tension control device of the invention shown partly in section, FIG. 5 is a side elevational section of straight stitches most suitably formed.

FIG. 6 shows a plain view of zigzag stitches most suitably formed, and

FIG. 7 shows a front elevational section of a zigzag stitch in FIG. 6.

DETAILED DESCRIPTION OF THE INVENTION

The present invention will be explained in reference to the attaching drawings. In FIG. 1 of the drawings, the numeral 1 is an electric signal indicating the thickness of a fabric to be sewn. The reference numeral 2 is an electric signal indicating the feeding amount of the fabric and the zigzag amplitude of the needle. The reference numeral 3 is an electric signal indicating the thickness and sort of the upper thread to be used (for example, silk, cotton etc.). These signals are applied to an arithmetic logic unit 4 which identifies a suitable amount of the upper thread to be supplied to the needle. The output signal of the arithmetic logic unit 4 is applied to a Digital to Alalog converter 5 so as to be changed into an analog value. The analog signal is then applied to a comparator 6 and becomes a reference signal. The reference numeral 7 is an electric signal indicating an actual amount of the upper thread supplied. The signal 7 is also applied to the comparator 6. The comparator 6 compares the reference signal and the signal 7, and produces an output to control the thread tension adjusting device 8 of the sewing machine in such a manner that the identified suitable amount of upper thread supply and the actual amount of upper thread supply become the same.

FIG. 2 shows one example of a mechanism measuring the fabric thickness for obtaining a signal indicating the fabric thickness. In this mechanism, a slide-type variable resistor 9 cooperates with a pressor bar 10 of the sewing machine to convert the vertical movement of the presser bar into a resistance value. The pressor bar 10 presses a plurality of the fabrics 11 in layers to be sewn as shown in FIG. 2. Thus the fabric thickness measuring mechanism can measure the total thickness of the fabrics by means of the resistance value of the variable resistor 9 when a feed dog 12 is at the lower dead point giving no influence to the fabric and the pressor bar.

FIG. 3 shows a mechanism for obtaining the signal indicating the thickness and sort of the upper thread and a mechanism for measuring the actual amount of the upper thread supply. A spool 14 wound with an upper thread 13 has a vertical and axially hollow central shaft 15. The spool shaft 15 has a lower end inscribed with an information as a bar code 16 indicating the thickness and sort of the wounded thread. The lower part of a spool pin 17 is surrounded by a face of a hole 18 which is provided with a light sensor such as a phototransistor for reading out the bar code 16. Therefore, when the spool 14 is mounted on the spool pin 17 and the lower part of the shaft 15 is inserted into the hole 18, the sensor reads out the bar code 16 and produces the signal of the thickness and sort of the wounded thread. The reference numeral 19 is a roller rotatably pivoted outside of the machine housing between the spool 14 and the thread tension divice (not shown) for measuring the actual amount of the thread supply. The upper thread 13 of the spool 14 is wounded several times around the roller 19. If the upper thread 13 is supplied drawn out as the sewing machine is driven the roller 19 is rotated and the rotation speed is changed in proportion to the drawn out amount of the upper thread. If the rotating amount of the roller 19 is measured by a rotation detecting sensor such as a rotary generator or a rotary encoder the drawn out amount of the upper thread 13 can be measured.

FIG. 4 shows one example of the thread tension adjusting device. In this device, a reversible motor 20 such as a pulse motor has a rotary shaft 21 which is partly threaded as shown by 22. The threaded part 22 of the shaft is in threaded engagement with a shaft 24 of a stopper 23, which is laterally moved in accordance with the rotation of the reversible motor 20. 25 is a pair of thread tension discs clamping the upper thread, and a thread tension spring 26 is furnished between the stopper 23 and one of the thread tension discs 25. The pressure applied to the thread by the thread tension discs 25 is changed in accordance with positions of the stopper 23. Therefore, if the reversible motor 20 is controlled by the output signal from the comparator 6, the stopper 23 is accordingly moved to effect a suitable thread tension. Regarding the amount of feeding the fabric and the lateral amplitude of the needle, the signals may be obtained directly from cams and links within the sewing machine, which determine the respective amplitudes. In the sewing machine including a plurality of pattern selecting buttons outside of the machine housing corresponding to various kinds of patterns, such signals may be obtained from the selecting buttons. Such signals may be obtained from a memory if the sewing machine is provided with such a memory as the Integrated Circuit memory storing the information of the feeding and zigzag amounts. Similarly, with respect to the thickness and sort of the thread, such signals may be obtained from the selecting buttons provided outside of the machine housing corresponding to the thickness and sort of the thread.

The calculation of the arithmetic logic unit 4 will be briefly explained regarding the straight stitching and the zigzag stitching. It is experimentally known that the drawn out amount of the upper thread varies substantially in proportion to the thickness and sort of the thread. It is assumed that C is a proportional constant varied in dependence upon the thickness and sort of the upper thread. FIG. 5 illustrates a side elevational section of straight stitches along the feeding direction when the seams are most suitably formed. A numeral 11 is a plurality of fabrics one on the other to be sewn together, and a reference letter "t" is a total thickness of the fabrics, and a letter "l" is the feeding amount that the feeding dog 12 feeds the fabric 11 per one stitch. 13 is the upper thread and 27 is a lower thread. In such seams most suitably formed, the upper thread 13 and the lower thread 27 get twisted at the center in the thickness of the fabrics as shown. The drawn out amount of upper thread per one stitch can be obtained by a formula $C(l+2xt/2)$.

FIG. 6 illustrates a plan view of zigzag stitches when the seams are most suitably formed, and FIG. 7 is a front sectional view of the same, but seen from the feeding direction. A reference letter "W" is a lateral swinging amplitude of the needle, "P" is a length of the upper thread exposed above the fabric per stitch, and "a" is a part of the upper thread exposed under the fabric. When the zigzag stitches are most suitably formed, the upper thread and the lower thread get twisted under the fabric as shown. The drawn out amount of thread per one stitch is obtained by a formula $C(P+2t+2a)$. Further, "P" denoting the length of upper thread exposed above the fabric is obtained by a formula $P=\sqrt{l^2+W^2}$. It has been experimentally confirmed that a suitable zigzag stitch is obtained if the length "a" exposed under the fabric is made proportional to the needle swinging width "W". It is therefore assumed that this proportional constant is "K". Thus an equation "a"="KW" is obtained, and therefore the drawn out amount of upper thread per stitch can be obtained by a formula $C(\sqrt{l^2+W^2}+2t+2KW)$. Thus, it is possible to calculate the ideal drawn out amount of upper thread from the fabric feeding amount and the needle swinging amplitude.

When it becomes necessary to slightly change the calculating formulas of the arithmetic logic unit 4 for stitching various kinds of complicated patterns, such changes can be effected by controlling the arithmetic logic unit 4 by means of the pattern selecting buttons outside of the machine housing or a memory storing the patterns such as an Integrated Circuit memory built in the machine housing.

As mentioned above, the drawn out amount of upper thread is identified by the stitching conditions such as the fabric thickness, the thickness and sort of the upper thread, the fabric feeding amount and the needle amplitude, and the actual drawn out amount of upper thread is measured, and the identified value and the measured value are compared to automatically control the thread tension.

What is claimed is:

1. A thread tension control device for a sewing machine of the type having a pressor bar with a pressor foot, a spool for supplying an upper thread, a feed dog for feeding a fabric to be sewn and a thread tension device including a pair of thread tension discs, comprising means for measuring the amount of thread actually drawn out from the spool during operation; means for changing the measured amount of thread into a first electrical signal operatively connected to said means for measuring the amount of thread; means for measuring the thickness of a fabric to be sewn; means for changing the measured thickness into a second electrical signal operatively connected to said means for measuring the thickness of a fabric; means for measuring a fabric feeding amount; means for changing the measured fabric feeding amount into a third electrical signal operatively connected to said means for measuring a fabric feeding amount; means for measuring the thickness of thread to be used; means for changing the measured thickness of the thread into a fourth electrical signal operatively connected to said means for measuring the thickness of thread; means for receiving the second, third and fourth electrical signals and changing the same into a value identifying the desired amount of thread drawn out from the spool on the stitching conditions; comparator means for comparing said value identifying the desired amount of thread with said first signal identifying the actual amount of thread drawn out from the spool, to produce a difference value; and means for adjusting the thread tension device operatively connected to said tension discs and to said comparator means and operative for adjusting the position of said tension discs in response to said difference value.

2. The thread tension control device of claim 1, further comprising means for measuring a lateral swinging amplitude of the needle and means for changing said amplitude into a fifth electrical signal to be applied to said means for receiving the second, third and fourth electrical signals.

3. The thread tension control device of claim 1, wherein said means for measuring the thickness of a fabric includes a variable resistor operatively connecting with said pressor bar to convert the vertical movement of the pressor bar associated to the fabric to be into a resistance value.

4. The thread tension control device of claim 1, wherein said means for measuring a thickness of thread include a central shaft for supporting the spool thereon and provided with the information indicating the thickness of the thread to be used, a pin mounted on the sewing machine and a photosensor arranged on the sewing machine to read out the information when the spool with the shaft are mounted on said pin.

5. The thread tension control device of claim 1, wherein said adjusting means further include a reversible mortor and a stopper having a central hollow shaft arranged in threaded engagement with the drive shaft of said reversible motor and adapted to move axially relative to said thread tension discs as the reversible motor is driven, and a spring arranged between said stopper and said thread tension discs to pressure said discs in dependence on the position of said stopper relative to said tension discs.

6. The thread tension control device of claim 1, wherein said means for measuring the amount of thread actually drawn out from the spool include a roller rotatably mounted on the sewing machine and loaded with the thread from said spool so that the roller is rotated as the thread is drawn out from the spool during the stitching operation, and a detecting sensor adapted to measure the rotating amount of said roller.

* * * * *